United States Patent [19]

Danieau

[11] Patent Number: 5,545,085
[45] Date of Patent: Aug. 13, 1996

[54] HEATING-VENTILATION AND/OR AIR CONDITIONING APPARATUS FOR THE PASSENGER SPACE IN A MOTOR VEHICLE.

[75] Inventor: Jacques Danieau, Noisy Le Roi, France

[73] Assignee: Valeo Climatisation

[21] Appl. No.: 224,034

[22] Filed: Apr. 7, 1994

[30] Foreign Application Priority Data

Apr. 9, 1993 [FR] France .................................. 93 04272

[51] Int. Cl.⁶ .................................................. B60H 1/04
[52] U.S. Cl. .......................... 454/124; 165/43; 219/202; 237/12.3 A; 454/121; 454/159; 454/148
[58] Field of Search .................. 165/42, 43; 237/12.3 A; 219/202, 203; 392/379; 454/121, 124, 126, 127, 139, 148, 159, 161

[56] References Cited

U.S. PATENT DOCUMENTS

| | | |
|---|---|---|
| 3,004,752 | 10/1961 | Armes et al. . |
| 3,809,151 | 5/1974 | Scheidel et al. ................. 454/161 X |
| 3,881,546 | 5/1975 | Otsuka et al. ............................ 165/42 |
| 3,924,524 | 12/1975 | Whisler .................................. 454/161 |
| 4,223,754 | 9/1980 | Mizuno et al. ..................... 454/154 X |
| 4,574,873 | 3/1986 | Kawahira et al. .................. 454/148 X |
| 5,356,337 | 10/1994 | Dauvergne .......................... 454/148 X |

FOREIGN PATENT DOCUMENTS

| | | |
|---|---|---|
| 0281457 | 7/1988 | European Pat. Off. . |
| 1373871 | 8/1964 | France .................................... 454/154 |
| 2667829 | 4/1992 | France . |
| 2236152 | 2/1974 | Germany ............................... 214/202 |
| 52-95432 | 8/1977 | Japan . |
| 61-33314 | 2/1986 | Japan . |

Primary Examiner—Harold Joyce
Attorney, Agent, or Firm—Morgan & Finnegan

[57] ABSTRACT

The components of a heating-ventilation and/or air conditioning apparatus, which are disposed on the side of the passenger space in relation to a transverse partition separating this passenger space from the engine compartment, are disposed one after the other in a substantially horizontal direction along the longitudinal axis of the vehicle and are mounted centrally in the dashboard.

The components of the apparatus may thus be grouped in a central module of the dashboard and are particularly suitable for motor vehicles of the "single box" type.

5 Claims, 5 Drawing Sheets

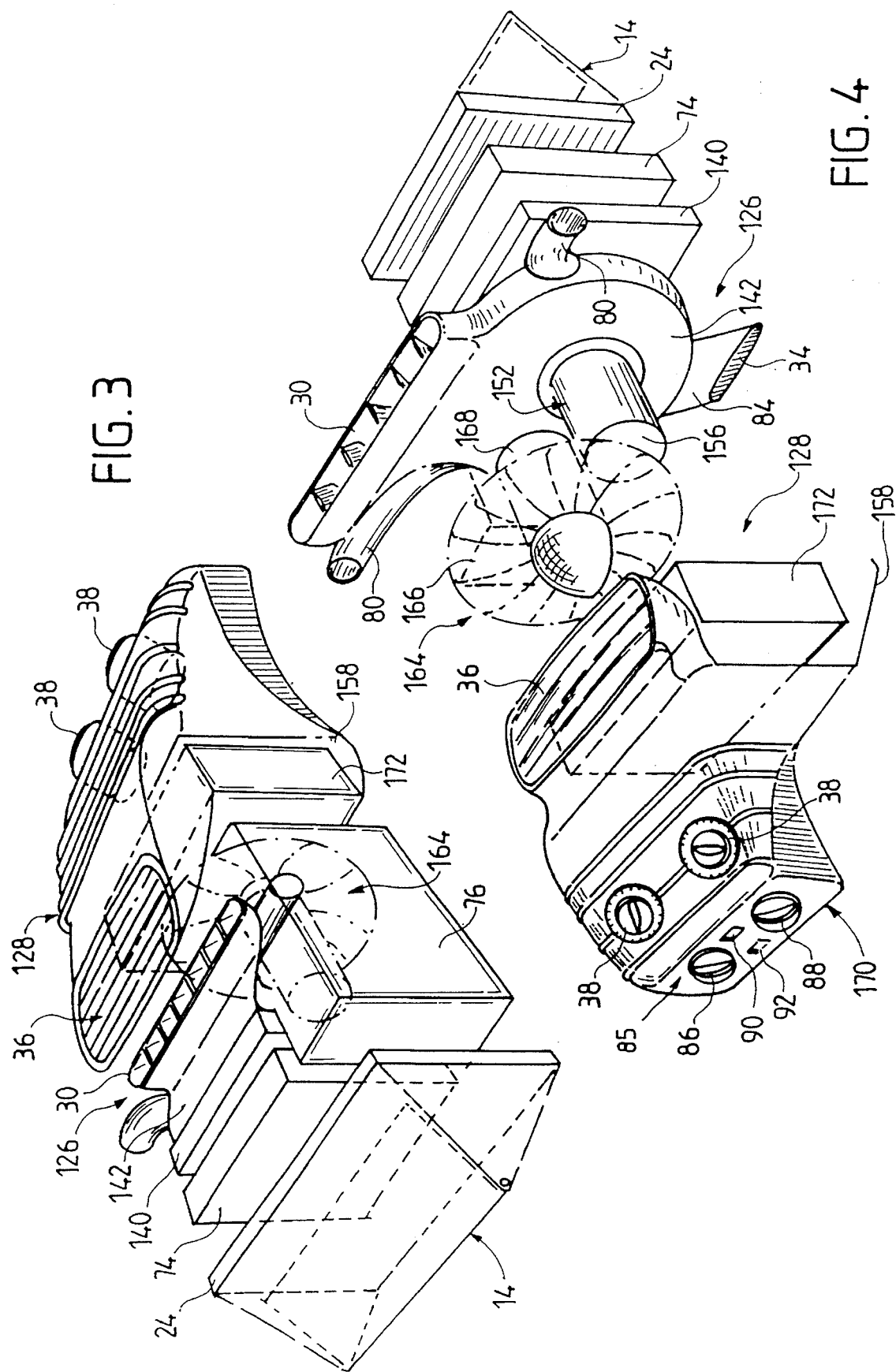

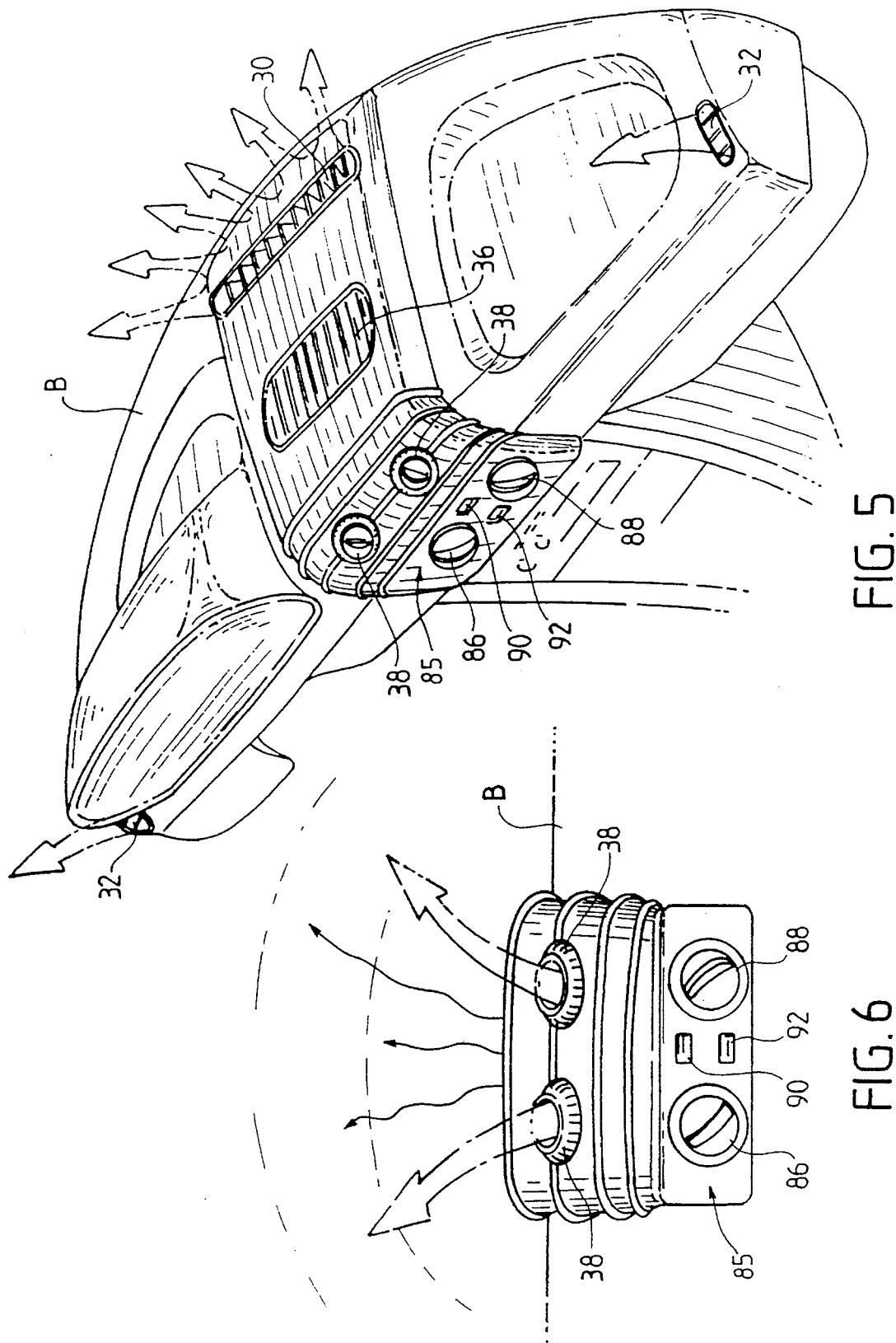

5,545,085

HEATING-VENTILATION AND/OR AIR CONDITIONING APPARATUS FOR THE PASSENGER SPACE IN A MOTOR VEHICLE.

BACKGROUND OF THE INVENTION

1. Field of the Invention

The invention relates to a heating-ventilation and/or air-conditioning apparatus for the passenger space of a motor vehicle, of the kind comprising components disposed on both sides of a transverse partition separating the passenger space from the front engine compartment.

2. Description of the Prior Art

In an apparatus of this kind, the components are fixed to the transverse partition, which may be an integral part of the vehicle's bodyshell or which may be made in the form of a panel mounted in the bodyshell, as described in French Patent Appplication No. 87 02271 in the Applicant's name.

The components of the apparatus situated on the side of the engine compartment essentially comprise a separator, the function of which is to separate rain water from the air taken from the outside beneath the windshield, an air intake device intended to convey at will either the air taken from the outside or the recirculated air from the passenger space, and an electric fan unit for conveying the outer air or the recirculated air towards the passenger space.

The components of the apparatus situated on the side of the passenger space comprise a radiator for heating the air coming from the electric fan unit and an air distributor from which come air ducts ending in vents opening towards the passenger space. These vents normally comprise at least one demisting vent for the windshield, at least one demisting vent for the side windows, at least one air vent situated on the dashboard and at least one vent opening towards the lower part of the passenger space.

These components may also comprise an evaporator should the vehicle be equipped with an air-conditioning option.

In this latter case, the evaporator is placed upstream from the radiator, which enables, if desired, the air to be cooled in order to dehumidify it before reheating it.

The apparatus of the above-mentioned type have a certain number of drawbacks.

Firstly, they require ducts of great length to connect the distributor to the various vents, which increases the distance to be covered by the air and for this reason results in losses of energy, in particular of heat energy.

Moreover, these apparatus are poorly adapted to present vehicles, particularly to vehicles known as "single box", in which the windshield is strongly inclined as an extension of the hood. In such vehicles the driver's compartment is very elongated in the longitudinal direction and therefore it is necessary to provide air ducts which are not just long, but also have complex shapes.

Furthermore, the air distributors of apparatus of the above-mentioned type have a complex structure and normally require several shutters mounted in a housing and a complex control mechanism for the shutters to distribute the air between the various vents opening towards the passenger space.

SUMMARY OF THE INVENTION

The object of the invention is in particular to overcome the above-mentioned disadvantages.

An object of the invention is in particular to provide a heating-ventilation and/or air-conditioning apparatus for the passenger space of a motor vehicle which is particularly suitable for vehicles in which the driver's compartment is elongated.

It is another object of the invention to provide an apparatus that enables a reduction in the distance travelled by the air and as a result enables energy savings to be made.

It is yet another object of the invention to create an apparatus having a much simpler structure than existing apparatus.

It is yet another object of the invention to create an apparatus which may just as well be suited to vehicles having a thermal engine as to vehicles having an electric engine.

For this purpose the invention proposes a heating-ventilation and/or air-conditioning apparatus for the passenger space of a motor vehicle of the above-mentioned type, in which the components disposed on the side of the passenger space are placed one after the other in a substantially horizontal direction along the longitudinal axis of the vehicle and are mounted centrally in the dashboard.

In this way there is produced a compact structure which can be integrated in the central part of the dashboard and which is particularly suitable for vehicles in which the driver's compartment is elongated and the dashboard is also elongated in the longitudinal direction of the vehicle.

According to another characteristic of the invention, the components disposed on the side of the passenger space are grouped in a central module of the dashboard which contains a heating device for the production of warm air and a ventilation device for the production of cool or conditioned air and which comprises vents connected to the heating device and vents connected to the ventilation device.

As a result the heating device on the one hand and the ventilation device on the other hand are each connected to specific vents, which enables the length of the air ducts to be reduced and the distributor of complex structure, which has hitherto been used in known apparatus, to be omitted.

The vents connected to the heating device advantageously comprise at least one demisting vent for the windshield, at least one demisting vent for the side windows and at least one vent opening towards the lower part of the passenger space, i.e. towards the feet of the occupants of the vehicle.

The vents connected to the ventilation device advantageously comprise at least one vent placed in the upper part of the dashboard and at least one vent placed in the front part of the dashboard.

According to another characteristic of the invention, the heating device is situated towards the front of the dashboard, i.e. towards the front of the vehicle, and the ventilation device towards the rear of the dashboard, i.e. towards the rear of the vehicle.

This arrangement enables the length of ducts connecting the heating device to the corresponding vents and the ventilation device to the corresponding vents to be reduced as much as possible.

According to another characteristic of the invention, the central module comprises a control panel connected to the heating device and to the ventilation device.

BRIEF DESCRIPTION OF THE DRAWINGS

In the following description, given by way of example, reference is made to the attached drawings, in which:

FIG. 3 is a perspective view of art apparatus according to a second embodiment of the invention;

FIG. 4 is another perspective view of the apparatus of FIG. 3;

FIG. 5 is a perspective view of the dashboard of a vehicle equipped with the apparatus shown in FIGS. 3 and 4;

FIG. 6 is a partial front view corresponding to FIG. 5;

DETAILED DESCRIPTION OF THE EMBODIMENTS

Figure 1:
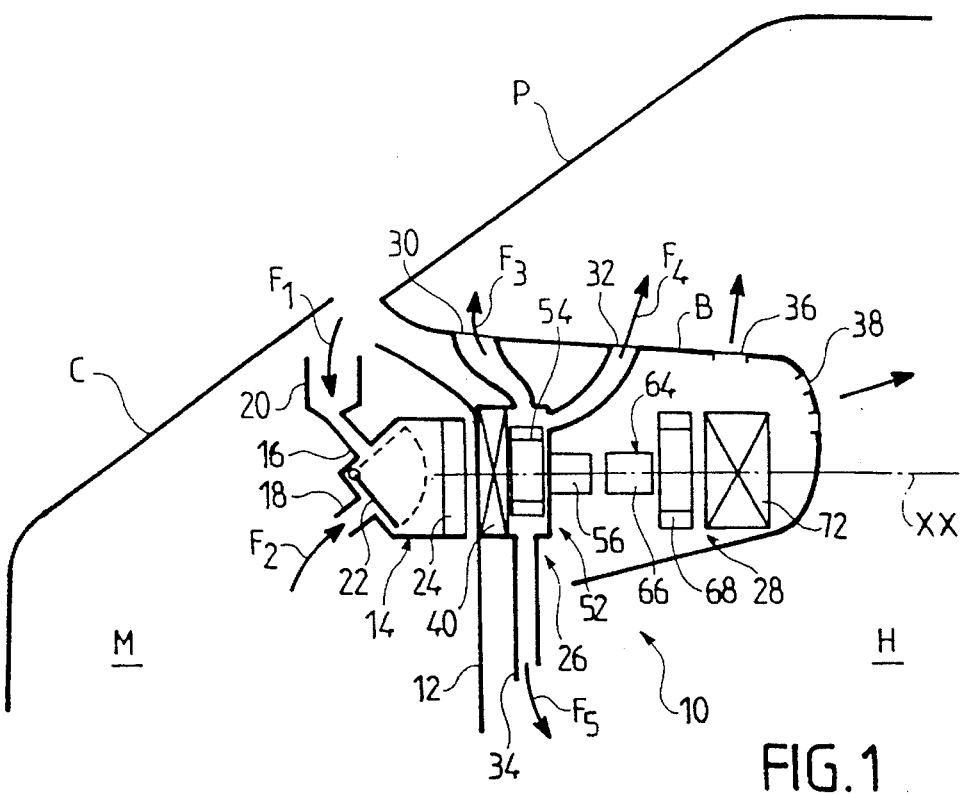
FIG. 1 is a partial view in longitudinal section of a motor vehicle, of the single box type, equipped with an apparatus according to a first embodiment of the invention.

First of all reference is made to FIG. 1, which represents a heating-ventilation and/or air-conditioning apparatus 10 which comprises components disposed on both sides of a transverse partition 12 separating the passenger space H from the front engine compartment M of a motor vehicle. In the example, it is a "single box" type vehicle, in which the windshield P is strongly inclined and which is situated substantially in the extension of the hood C.

The components of the apparatus situated in the engine compartment M comprise an air intake device 14 equipped with an inlet 16 for the air (arrow F1) taken from outside the vehicle and an inlet 18 for recirculated air (arrow F2) from the passenger space H. Inlet 16 is connected to a separator 20, the function of which is to separate rainwater from the air taken from outside beneath the windshield P.

The intake device 14 comprises a pivoting shutter 22 which can be moved between two positions: a closed position of inlet 18 (shown by a solid line in FIG. 1) and a closed position of inlet 16 (shown by a broken line in FIG. 1).

The air intake device 14 is equipped with a dust filter 24, which enables a flow of external or recirculated and filtered air to be produced, which is then conveyed through a passage in partition 12 towards the components of the apparatus 10 which are situated on the side of the passenger space H.

These components are placed one after the other in a substantially horizontal direction along the longitudinal axis XX of the vehicle and are housed centrally in the dashboard B.

These components are grouped in a central module of the dashboard B, which houses a heating device 26 for the production of warm air and a ventilation device 28 for the production of cool or conditioned air.

Heating device 26 is situated towards the front of the dashboard B, i.e. towards the front of the vehicle, and ventilation device 28 is situated towards the rear of the dashboard B, i.e. towards the rear of the vehicle. The filtered air coming from intake device 14 passes firstly through the heating device 26 to arrive at the ventilation device 28.

Heating device 26 is connected to at least one demisting vent 30 for the windshield P in order to direct a flow of air (arrow F3) towards the windshield, to at least one side vent 32 for sending a flow of air (arrow F4) towards a lateral window of the vehicle, and to at least one vent 34 for directing a flow of air (arrow F5) towards the lower part of the passenger space.

Ventilation device 28 is connected to at least one vent 36 placed in the upper part of the dashboard B and to at least one air vent 38 placed in the front part of the dashboard.

Heating device 26 comprises an electric heating radiator 40 (FIGS. 1 and 2) which comprises three successive electric radiators 40-1, 40-2 and 40-3 having for example respective resistances of 600 watts, 1000 watts and 100 watts. Radiator 40 could, as a variation, be formed by a radiator through which cooling fluid of the engine passes, in the case in which the vehicle in question is driven by a thermal engine, or one could envisage associating both an electric radiator and a radiator through which cooling fluid passes.

Heating device 26 comprises a heating housing 42 having an axial inlet 44 for air coming from the intake device 14 and possibly reheated by radiator 40. Housing 42 also comprises outlets 46, 48. Outlets 46 are connected to vents 30 and 32, whereas outlet 48 is connected to vent 34. Housing 42 contains an impeller 52 formed by a turbine 54 driven by a motor 56, the common axis of rotation of the motor and the turbine being along axis XX.

Ventilation device 28 comprises a housing 58 having an axial inlet 60 connected to inlets 50, 50', of housing 42 and an axial outlet 62. Housing 58 contains a ventilation impeller 64 formed by a helix 66 driven by a motor 68, in which the axis of rotation extends coaxially with that of motor 56, in the direction of axis XX.

At outlet 62 of housing 58 is mounted a diffusion housing 70 containing an evaporator 72.

Housings 42, 58 and 70 are mounted coaxially and thus form a compact module disposed centrally in the dashboard B.

Figure 2:
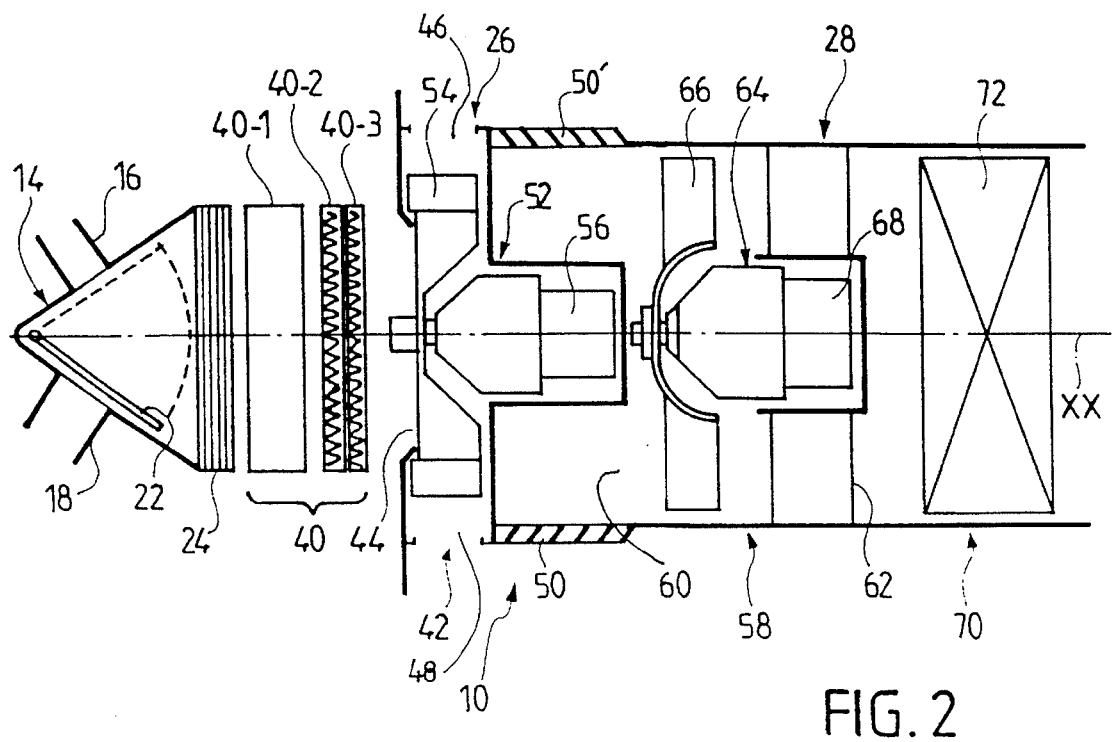
FIG. 2 is a diagrammatical representation of the apparatus of FIG. 1.

The apparatus of FIGS. 1 and 2, in which the heating impeller 52 and the ventilation impeller 64 are coaxial, are particularly suitable for a vehicle in which the dashboard B is very elongated in the longitudinal direction of the vehicle.

If a more compact arrangement is desirable, an apparatus according to the embodiments which will now be described can be used.

The apparatus shown in FIGS. 3 and 4 comprises a heating device 126 having a single heating housing 142 and a ventilation device 128 having a single ventilation housing 158.

As in the preceding embodiment, heating housing 142 is disposed towards the front and ventilation housing 158 towards the rear. The air conveyed by the intake device 14 which has passed through filter 24 supplies a common inlet of housings 142 and 158. This common inlet is formed by the junction of two adjacent connecting ducts: a main connecting duct 74 having a generally rectangular section leading to the heating housing 142 and a lateral connecting duct 76 having a rectangular section leading to the ventilation housing 158 by laterally running alongside the heating housing 142. The flow of air coming from filter 24 is therefore divided into two air flows: a first flow supplying the heating housing 126 via duct 74 and a second flow supplying housing 158 via duct 76.

Between duct 74 and housing 142 is placed a heating radiator 140 which may be of the electric type or of the type through which a warm fluid passes.

Figure 7:
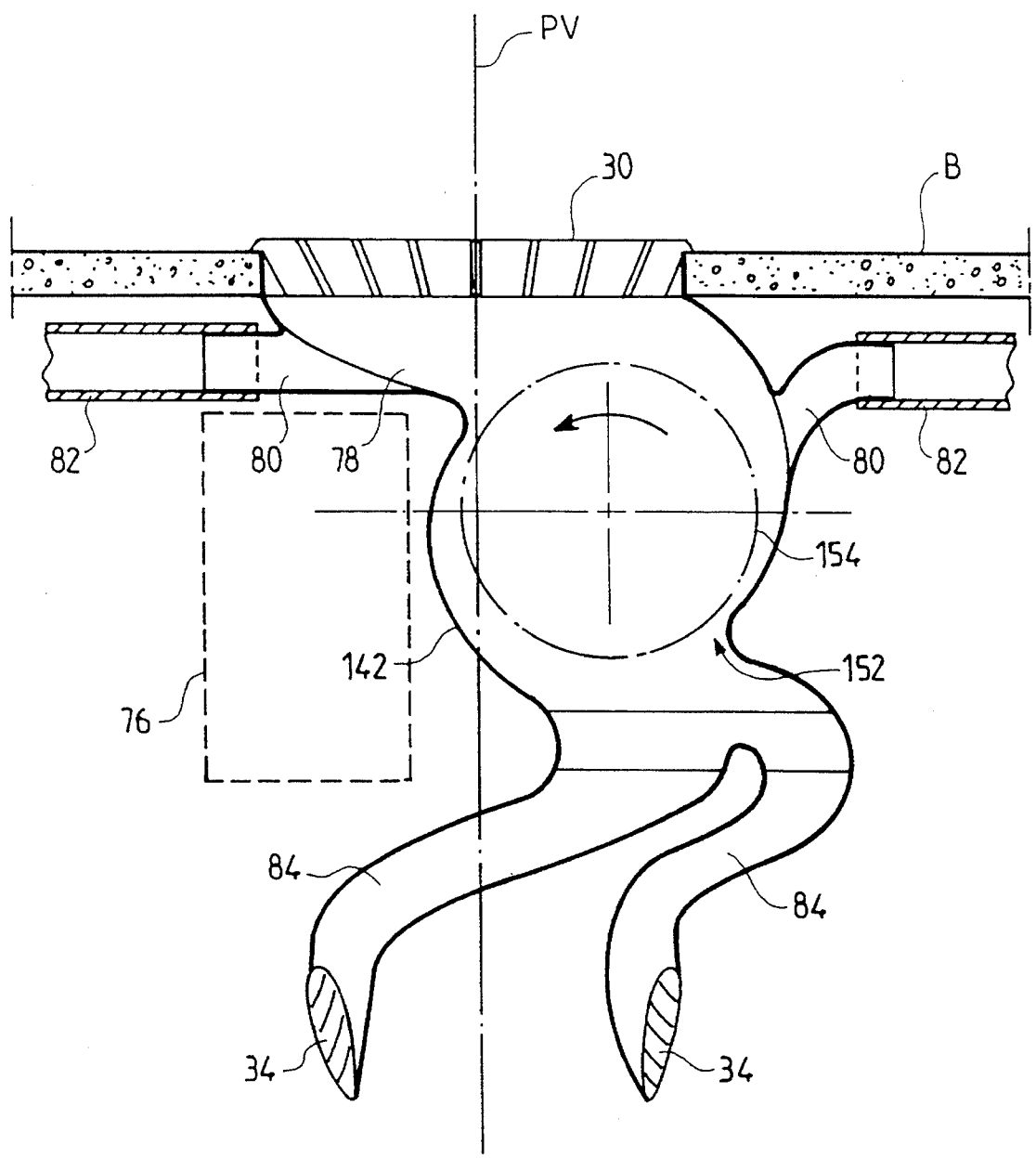
FIG. 7 is a cross-sectional view of the heating device the apparatus in FIGS. 3 and 4.

As can be seen in FIG. 7, the heating housing 142 is offset laterally towards the right-hand side of the vehicle, in relation to its mean vertical plane PV, in order to allow the passage of connecting duct 76 (shown by broken lines in FIG. 7). Housing 142 contains turbine 154 of impeller 152, the axis of rotation of which is also offset in relation to plane PV. Housing 142 is advantageously made from two moulded parts juxtaposed to form an upper branch 78 connected to vent 30, two lateral branches 80 connected respectively to lateral vents 32 by means of flexible ducts 82 and two lower branches 84 connected respectively to the two lower vents 34.

As can be seen in FIG. 4, motor 156 of the heating impeller 152 extends rearwardly in relation to the housing 142.

The ventilation impeller 164 is disposed on the side of impeller 152, and not coaxially as in the embodiment described above. The motor 168 of impeller 164 is situated parallel to and at the side of the motor 156, the helix 166 being situated towards the rear of the vehicle to form a "head-to-tail" type mounting (FIG. 4).

Ventilation housing 158 contains an evaporator 172 through which the air conveyed by impeller 164 can pass. The air can then be sent either towards vent 36, or towards vents 38 which form directable fans.

The fans 38 are borne by a diffusion housing 170 extending in the extension of heating housing 158 and forming a control panel 85 having control buttons 86, 88, 90 and 92 on its front part.

The apparatus shown in FIGS. 3 and 4 is particularly compact and can easily be integrated in the central part of the dashboard, as can be seen in FIGS. 5 and 6. All the vents are grouped on the central module, except for lateral vents 32 which are provided at the two ends of the dashboard and which are connected by ducts 82 as shown in FIG. 7.

Figure 8:
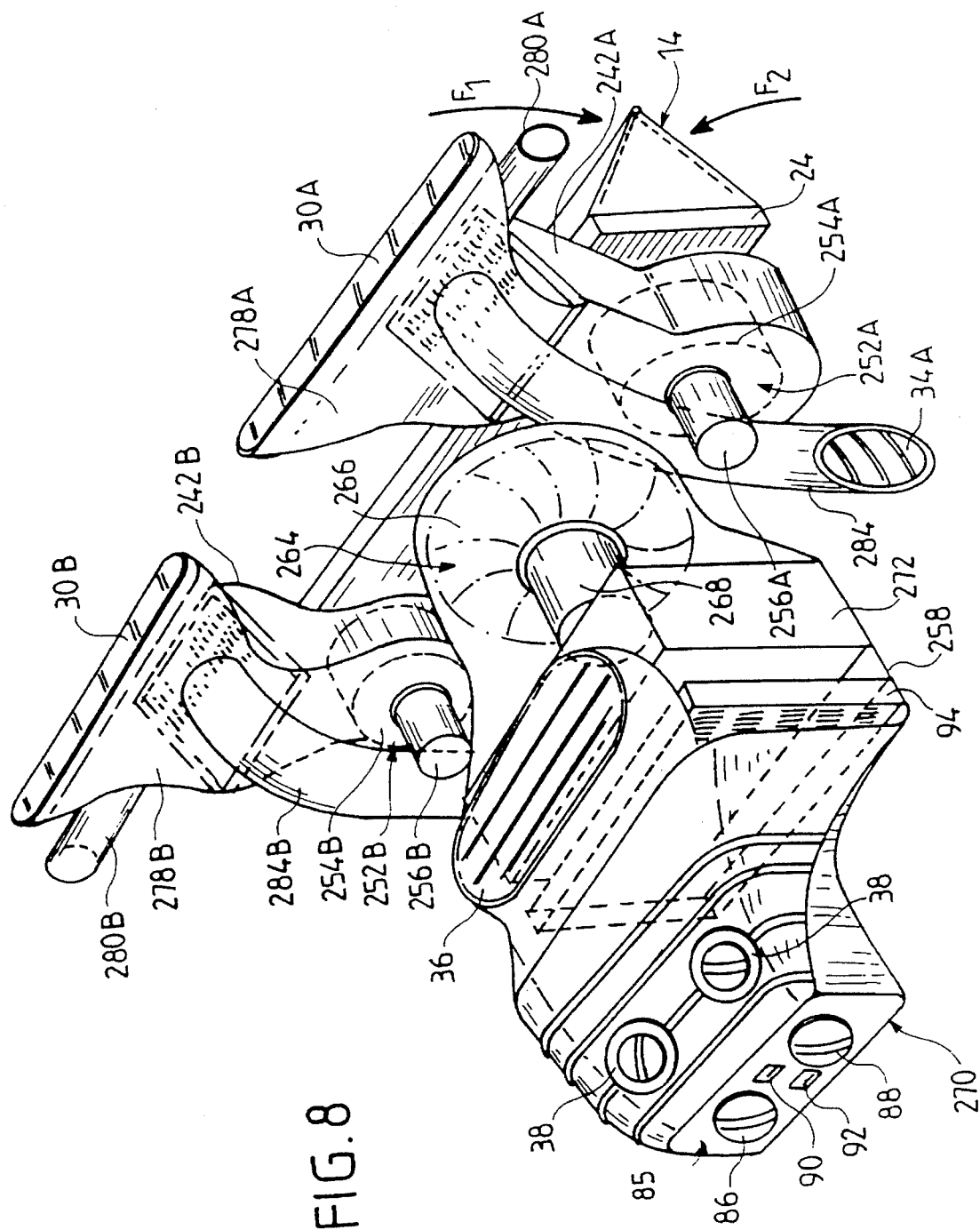
FIG. 8 is a perspective view of an apparatus according to a third embodiment of the invention.

Reference is now made to the embodiment shown in FIG. 8, which is similar to that in FIGS. 3 and 4.

In this case the heating apparatus comprises two heating housings 242A and 242B situated respectively on the right-hand side and the left-hand side of the passenger space and a single ventilation housing 258, the latter being situated towards the rear in relation to the two heating housings. Ventilation housing 258 is situated in the mean longitudinal axis of the vehicle, whereas the two housings 242A and 242B are situated respectively on either side of this axis. The air coming from the intake device 14 and having passed through the filter 24 is divided into three flows: a central flow supplying the ventilation housing 258 and two lateral flows supplying respectively the two heating housings 242A and 242B.

Housings 242A and 242B respectively contain two heating impellers 252A and 252B, each formed of a turbine 254A, 254B driven by an electric motor 256A, 256B. The two motors are disposed so that their respective axes are parallel and situated in a same horizontal plane, the motors being situated towards the rear of the vehicle in relation to the corresponding turbines.

Housing 242A comprises an upper branch 278A supplying a demisting vent for the windshield 30A, a lateral branch 280A supplying a lateral vent 32 and a lower branch 284 supplying a lower vent 34A.

In a corresponding manner, housing 242B comprises a branch 278B supplying a demisting vent for the windshield 30B, a lateral branch 280B supplying a lateral vent 32 and a branch 284B supplying another lower vent 34B (not visible on FIG. 8).

Housing 258 contains an impeller 264 disposed between the two impellers 252A and 252B. Impeller 264 has a turbine 266 situated between the two turbines 254A and 254B and a motor 268 situated between motors 256A and 256B. Turbine 266 is also situated towards the front of the vehicle in relation to motor 268.

Ventilation housing 258 is rearwardly extended by a diffusion housing 270 similar to housing 170 described above. Ventilation housing 258 contains an evaporator 272 for producing conditioned air.

In the example, housing 258 also contains an additional heating radiator 94, advantageously of the electric type, placed downstream from evaporator 272 in relation to the direction of circulation of the flow of air. This radiator enables, if necessary, the previously cooled and dehumidified flow of air to be reheated before sending it towards the passenger space.

The apparatus shown in FIG. 8 enables a separate control of the heating for the right-hand side and the left-hand side of the passenger space.

The heating-ventilation and/or air-conditioning apparatus of the invention is particularly suitable for motor vehicles having a very inclined windshield, in particular for vehicles known as "single box", regardless of whether these vehicles are driven by a thermal motor or by an electric motor.

What is claimed is:

1. An apparatus for one or more of heating, ventilation and air conditioning of the passenger space of a motor vehicle, characterized in that said apparatus comprises components disposed on both sides of a transverse partition separating the passenger space from the front engine compartment, wherein the components disposed on the side of the passenger space are placed one after the other in a substantially horizontal direction along the longitudinal axis of the vehicle and are mounted centrally in a dashboard, and wherein the components disposed on the side of the passenger space are grouped in a central module of the dashboard which comprises a heating device for the production of warm air, said heating device comprising a housing, at least one radiator, an impeller, at least one air inlet and at least one air outlet; a ventilation device for the production of cool or conditioned air, said ventilation device comprising a housing, an impeller, at least one evaporator, at least one air inlet and at least one air outlet; and vents connected to the heating device and vents connected to the ventilation device.

2. An apparatus according to claim 1, wherein the vents connected to the heating device comprise at least one demisting vent for a the windshield, at least one lateral demisting vent for a lateral window and at least one lower vent opening towards the lower part of the passenger space.

3. An apparatus according to claim 1, wherein the vents connected to the ventilation device comprise at least one vent placed in the upper part of the dashboard and at least one vent placed in the front part of the dashboard.

4. An apparatus according to claim 1, wherein said heating device is disposed towards the front of the dashboard and the ventilation device towards the rear of the dashboard.

5. An apparatus according to claim 1, wherein the central module comprises a control panel connected to the heating device and to the ventilation device.

\* \* \* \* \*